US011799336B2

(12) United States Patent
Yang

(10) Patent No.: US 11,799,336 B2
(45) Date of Patent: Oct. 24, 2023

(54) ROTOR AND MOTOR COMPRISING SAME

(71) Applicant: LG INNOTEK CO., LTD., Seoul (KR)

(72) Inventor: Jung Soo Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 389 days.

(21) Appl. No.: 17/418,427

(22) PCT Filed: Jan. 15, 2020

(86) PCT No.: PCT/KR2020/000712
§ 371 (c)(1),
(2) Date: Jun. 25, 2021

(87) PCT Pub. No.: WO2020/149626
PCT Pub. Date: Jul. 23, 2020

(65) Prior Publication Data
US 2022/0069648 A1 Mar. 3, 2022

(30) Foreign Application Priority Data
Jan. 17, 2019 (KR) .......................... 10-2019-0006179

(51) Int. Cl.
*H02K 1/276* (2022.01)
*H02K 7/00* (2006.01)
(Continued)

(52) U.S. Cl.
CPC ............. *H02K 1/276* (2013.01); *H02K 7/003* (2013.01); *H02K 15/03* (2013.01); *H02K 16/02* (2013.01)

(58) Field of Classification Search
CPC ......... H02K 1/276; H02K 7/003; H02K 16/02
See application file for complete search history.

(56) References Cited

U.S. PATENT DOCUMENTS

| 2009/0115278 A1 | 5/2009 | Choi et al. |
| 2022/0069648 A1* | 3/2022 | Yang ...................... H02K 7/003 |
| 2023/0137883 A1* | 5/2023 | Lee ....................... H02K 1/2773 |
| | | 310/156.08 |

FOREIGN PATENT DOCUMENTS

| CN | 113014010 A | * 6/2021 | ............. H02K 1/276 |
| CN | 113765324 A | * 12/2021 | |

(Continued)

OTHER PUBLICATIONS

International Search Report dated Apr. 22, 2020 issued in Application No. PCT/KR2020/000712.

*Primary Examiner* — Robert W Horn
(74) *Attorney, Agent, or Firm* — KED & ASSOCIATES, LLP

(57) ABSTRACT

An embodiment presents a motor comprising: a shaft; a rotor to which the shaft is coupled; and a stator which is disposed at the exterior of the rotor, wherein: the stator comprises a stator core and a coil which is wound around the stator core; the stator core comprises a yoke, a tooth which protrudes from the yoke, and a first groove and a second groove which are formed on the inner surface of the tooth; and distances from the center of the circumferential direction of the tooth to the first groove and the second groove are different from each other. Accordingly, the motor can reduce cogging torque through a design for the grooves disposed to be asymmetrical with reference to the center of the tooth.

20 Claims, 16 Drawing Sheets

(51) Int. Cl.
*H02K 15/03* (2006.01)
*H02K 16/02* (2006.01)

(56) References Cited

FOREIGN PATENT DOCUMENTS

| | | | |
|---|---|---|---|
| CN | 115411904 A | * | 11/2022 |
| CN | 217984682 U | * | 12/2022 |
| CN | 218976440 U | * | 5/2023 |
| JP | 2013-110933 | | 6/2013 |
| JP | 2016-082686 | | 5/2016 |
| KR | 10-2016-0139254 | | 12/2016 |
| WO | WO 2018-220677 | | 12/2018 |

\* cited by examiner

[FIG. 1]
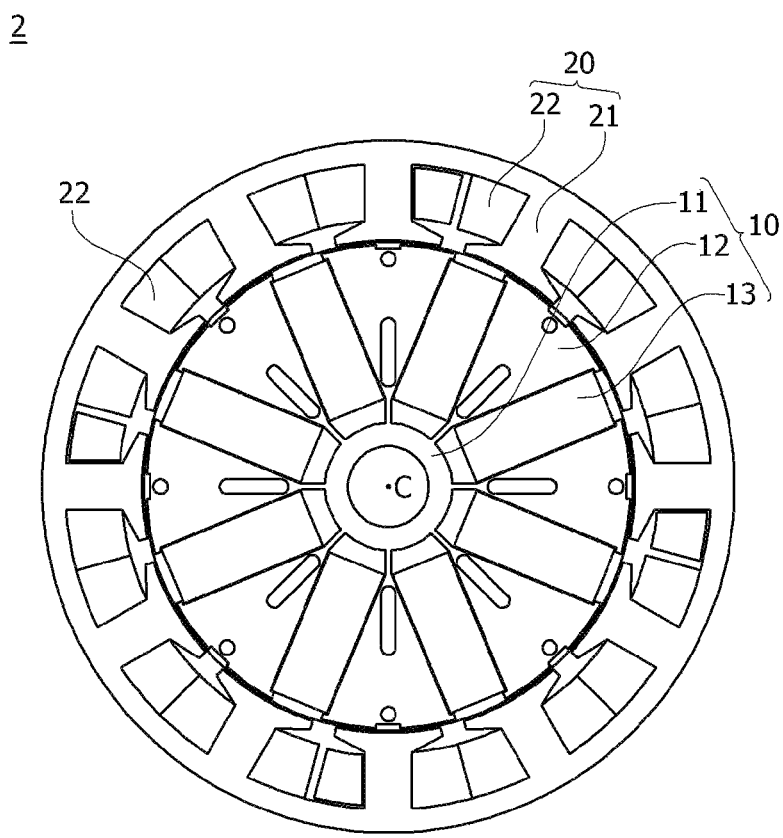

[FIG. 2]
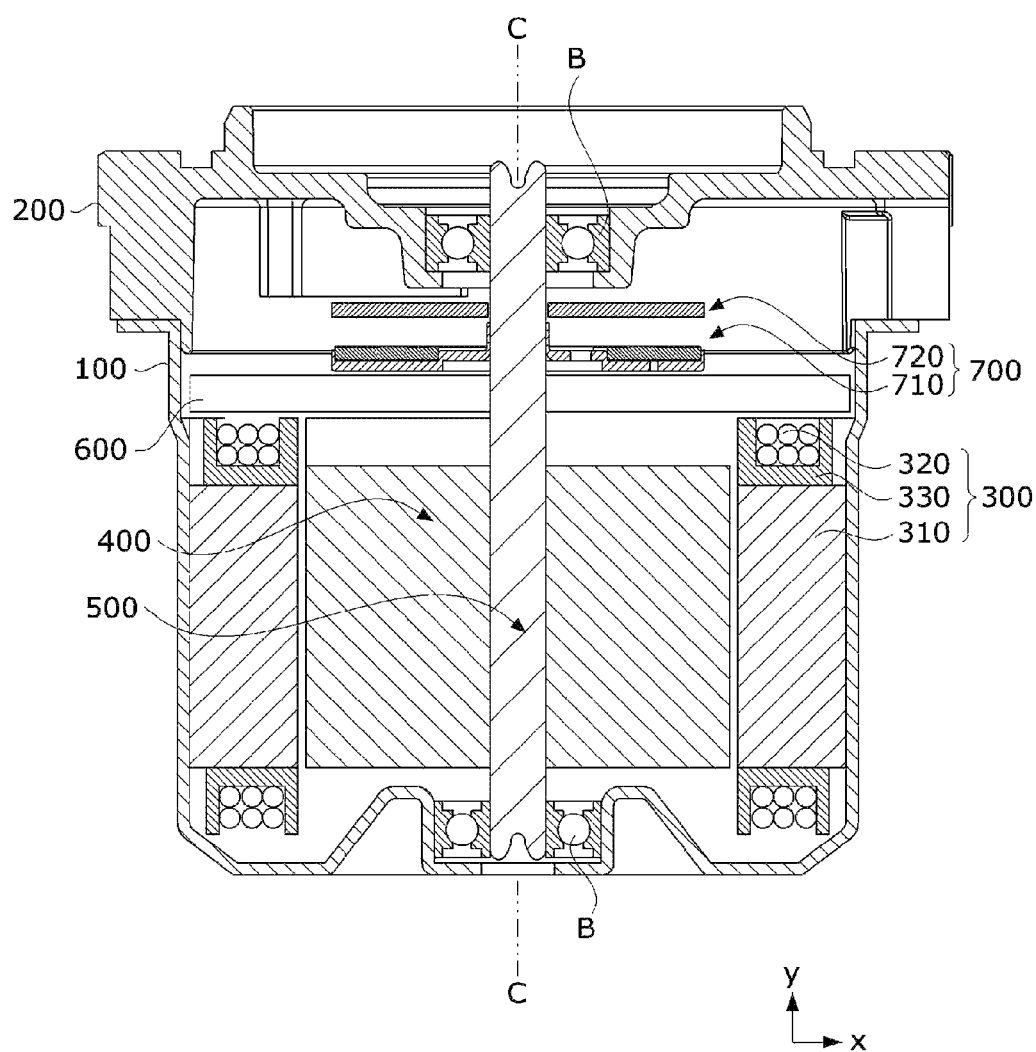

[FIG. 3]
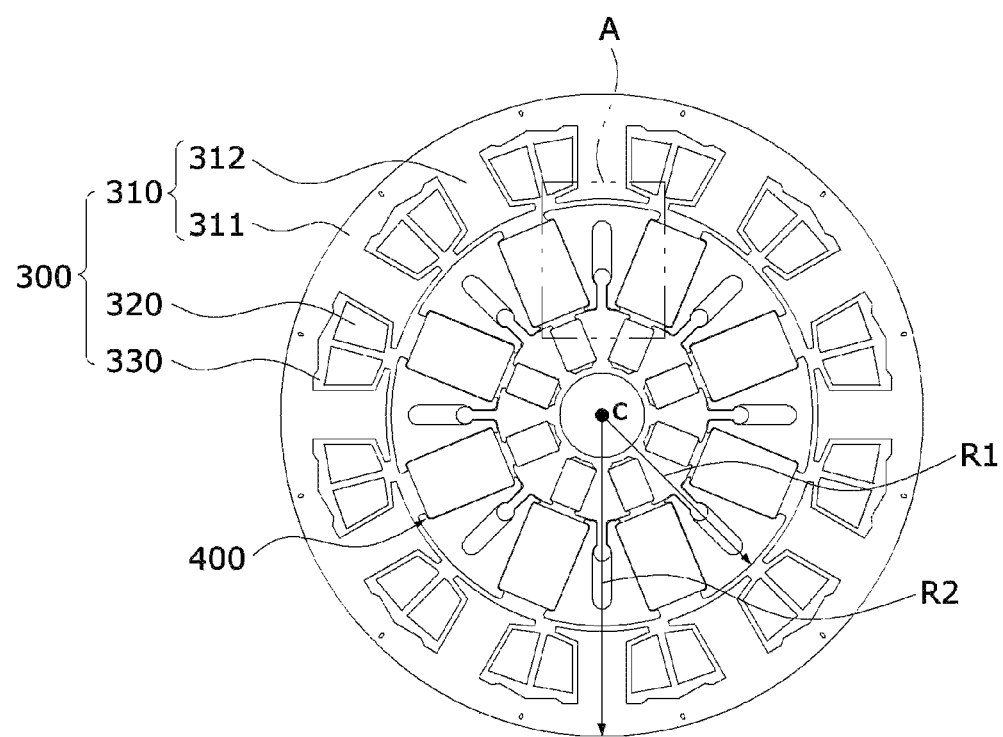

[FIG. 4]
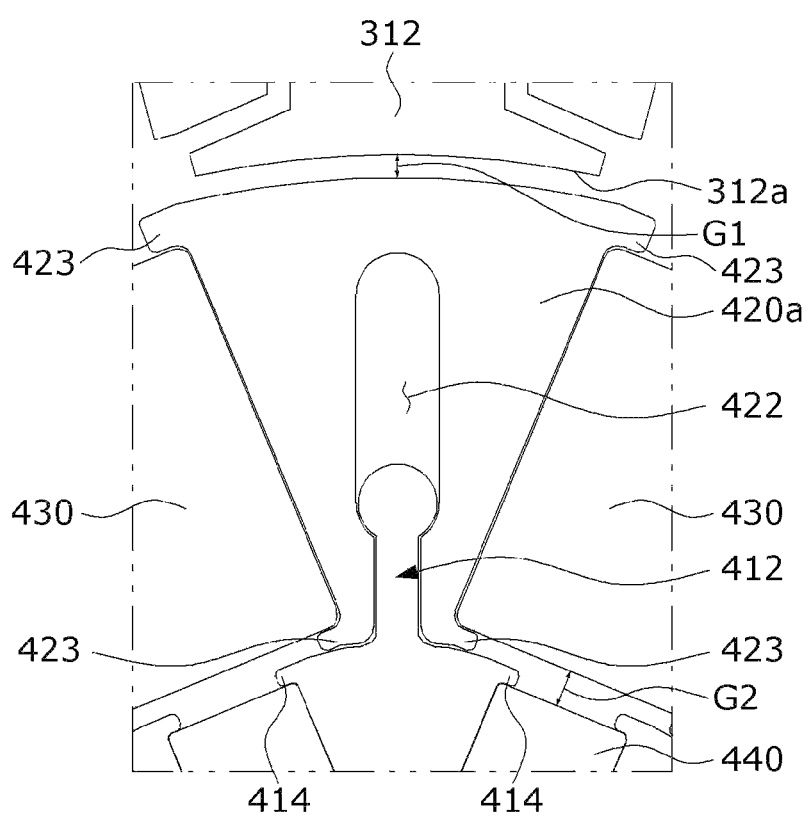

[FIG. 5]
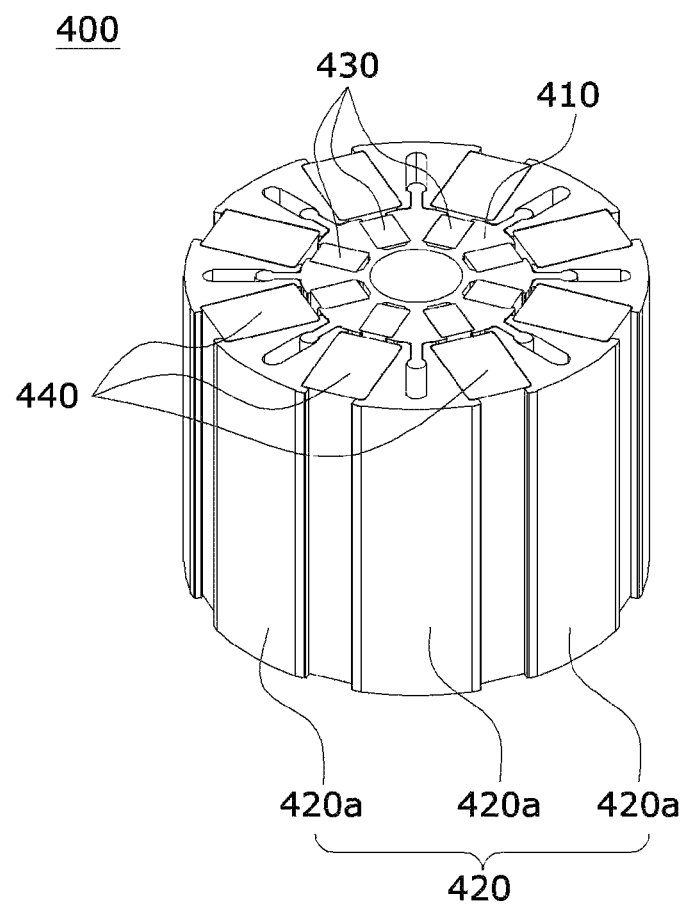

[FIG. 6]
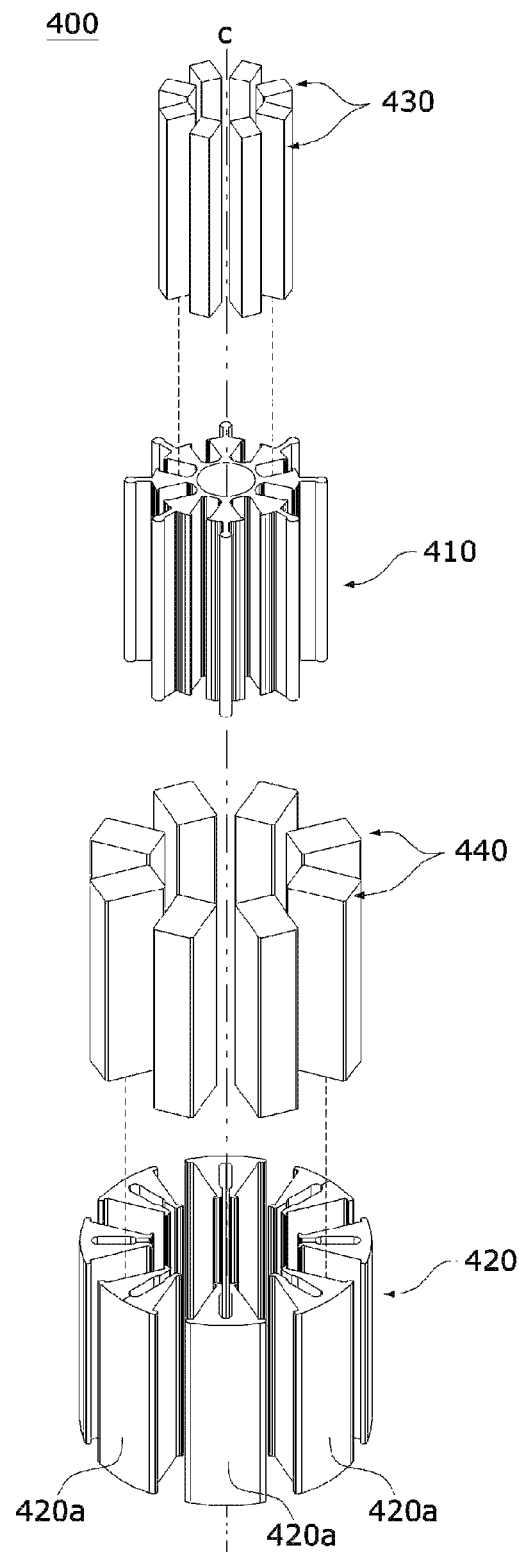

[FIG. 7]
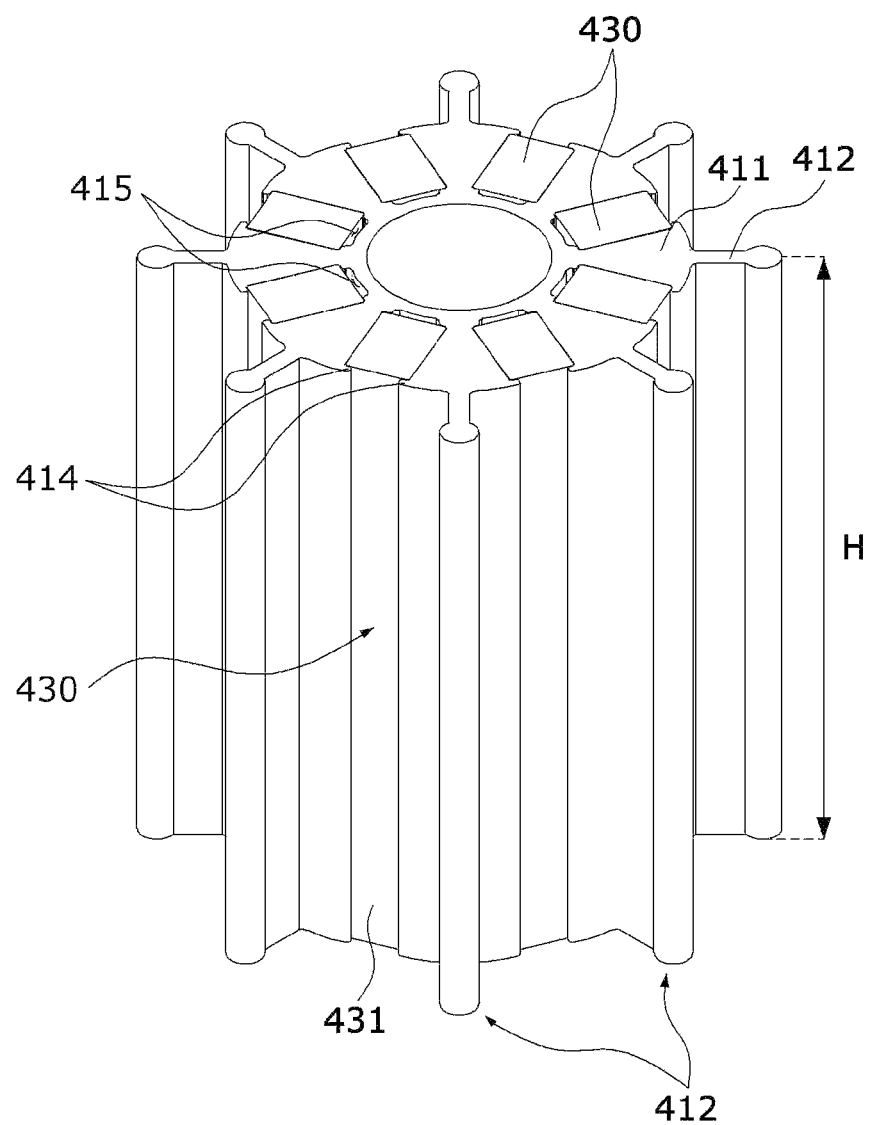

[FIG. 8]
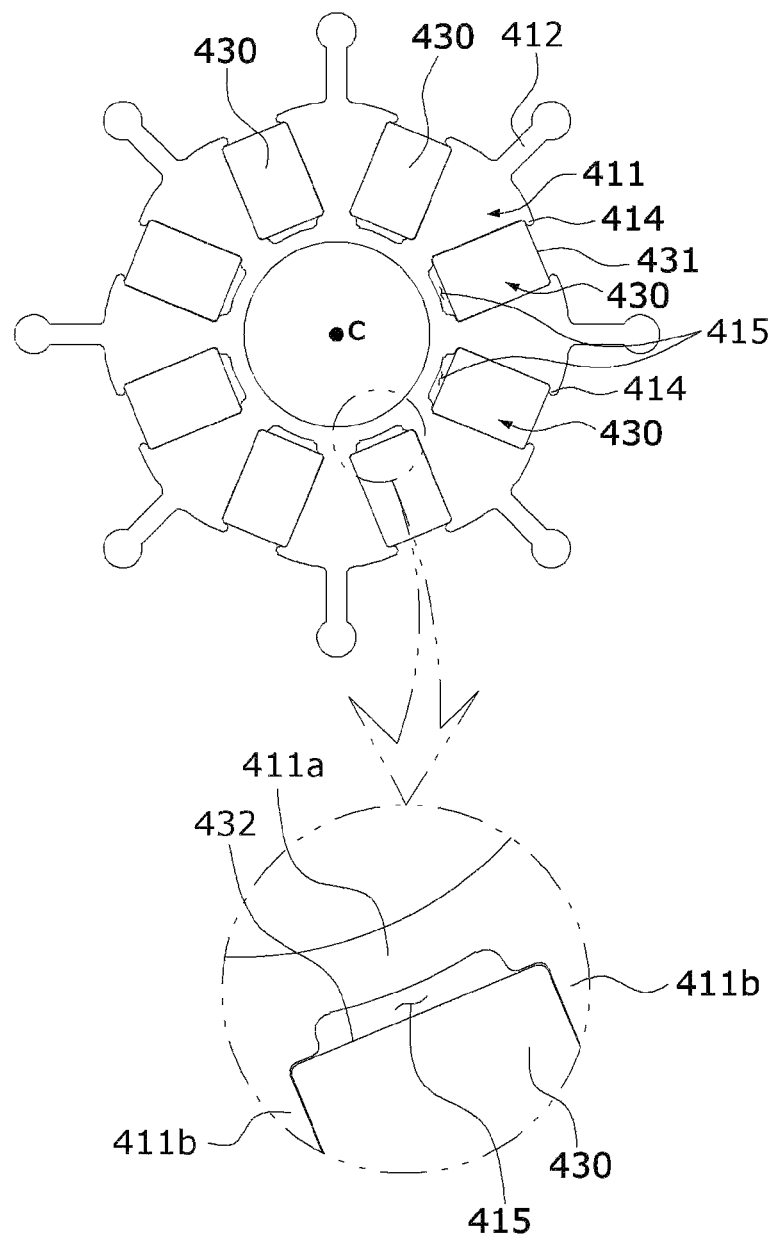

[FIG. 9]
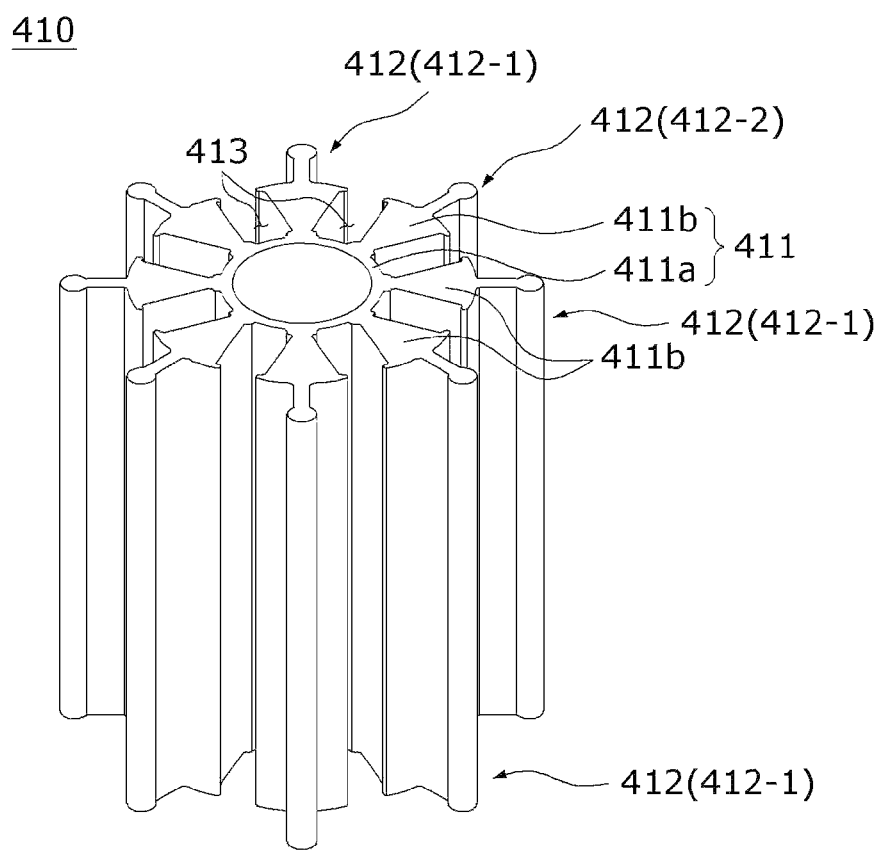

[FIG. 10]
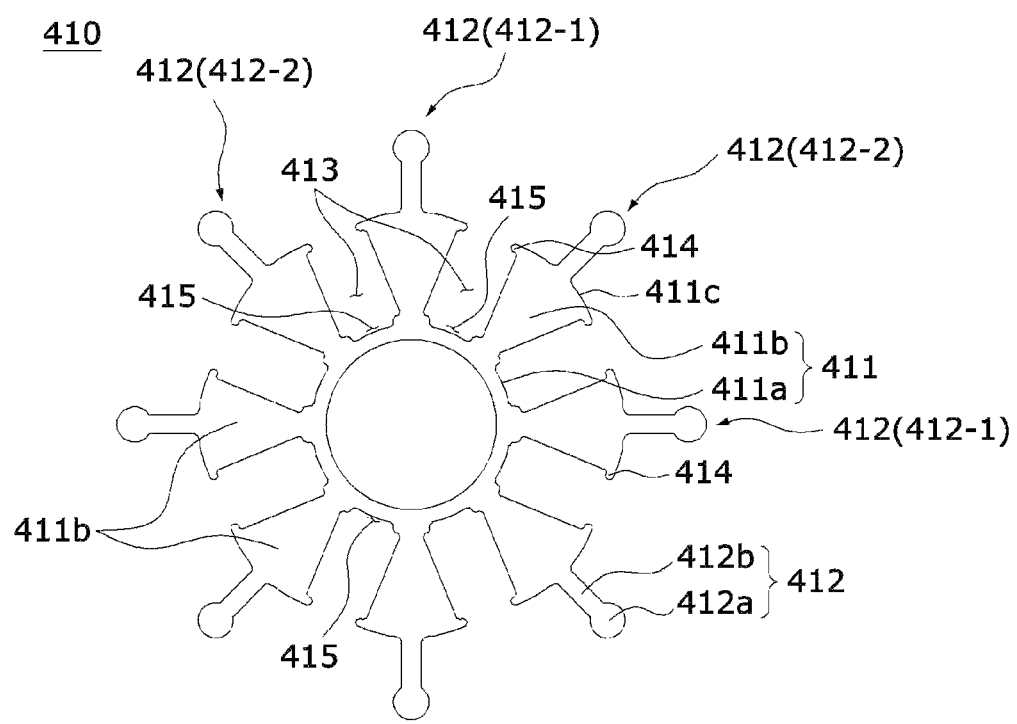

[FIG. 11]
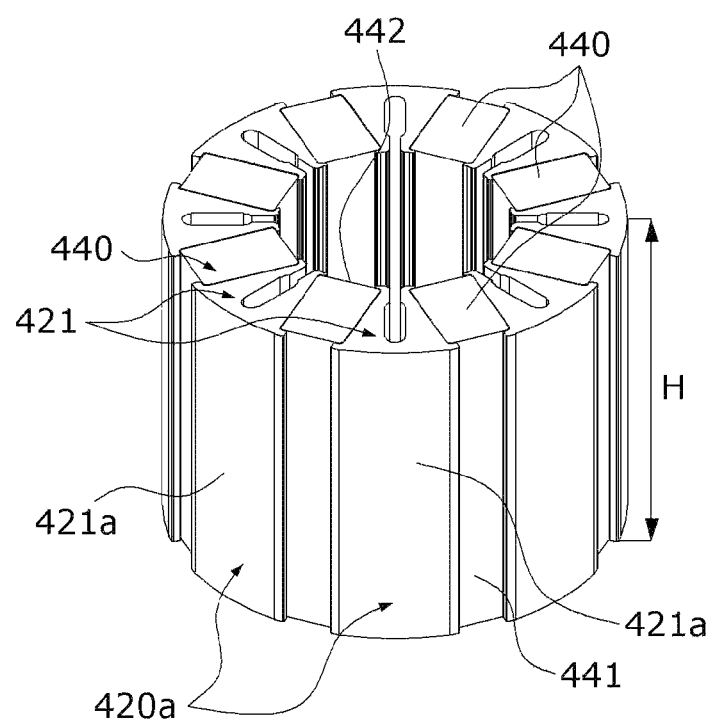

[FIG. 12]
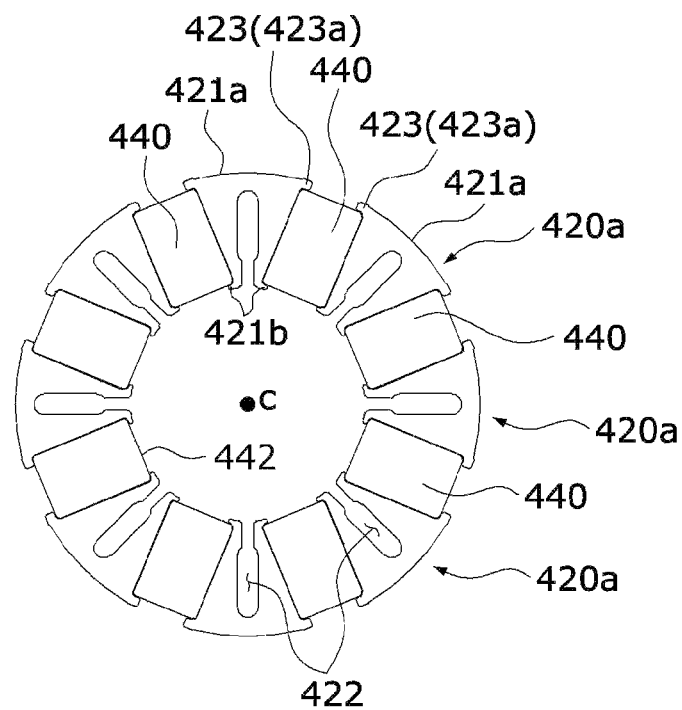

[FIG. 13]
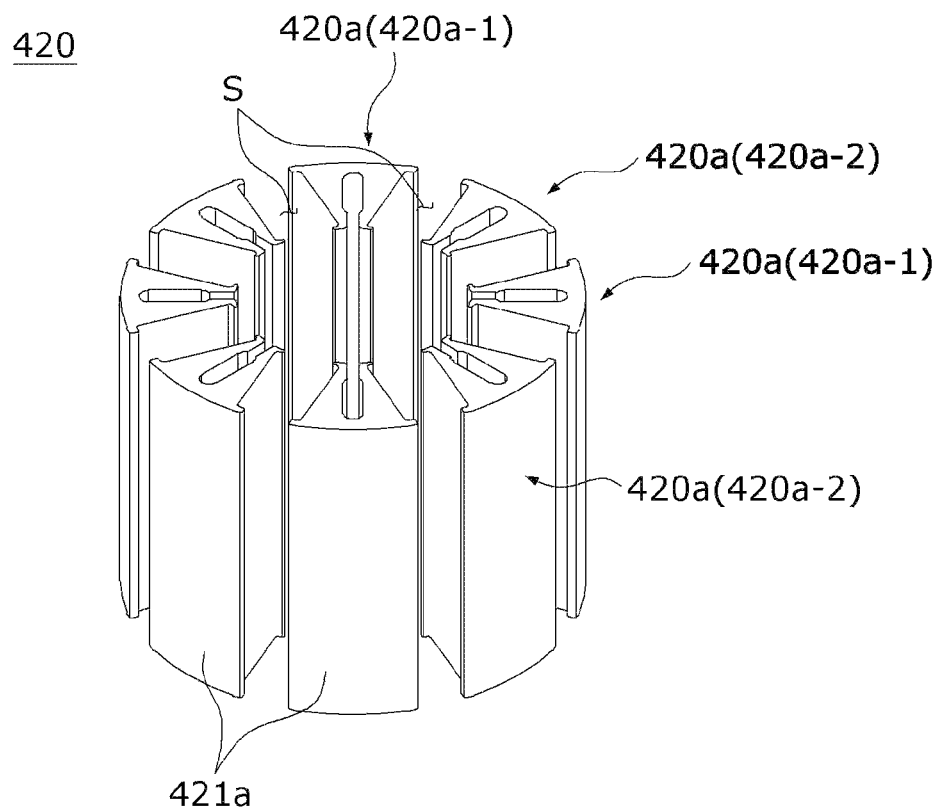

[FIG. 14]
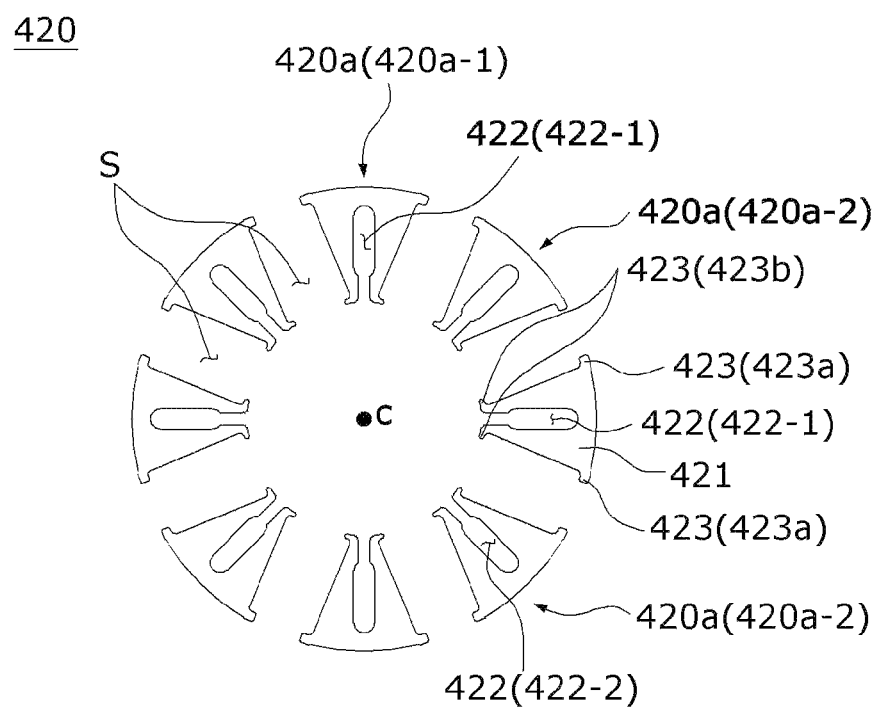

[FIG. 15]
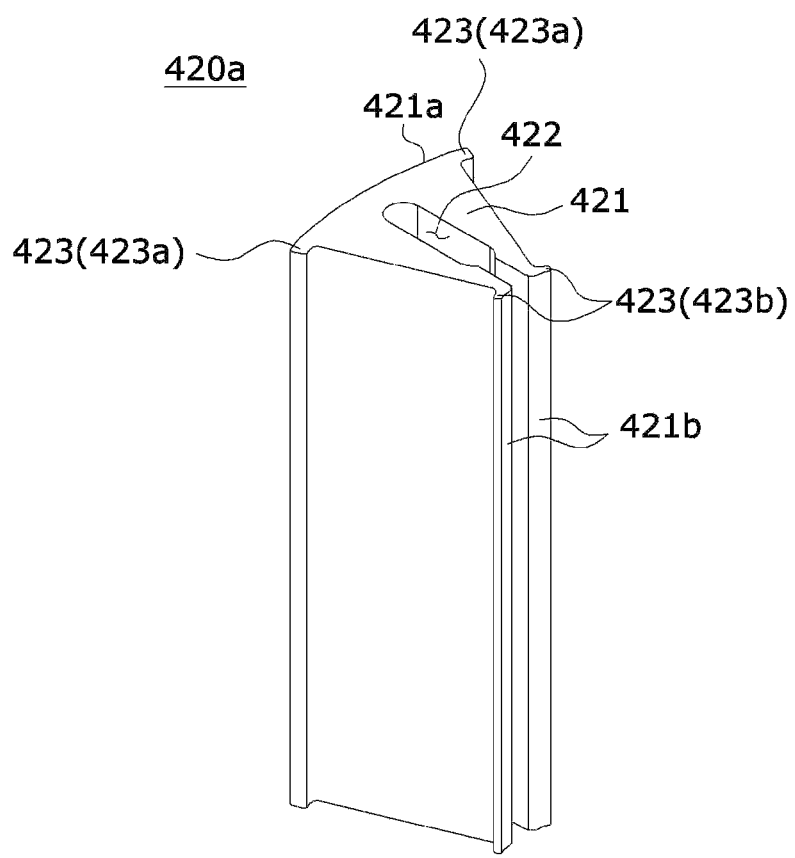

[FIG. 16]
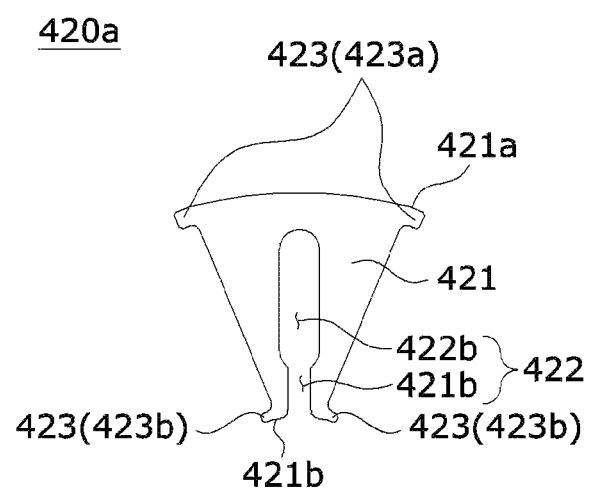

ROTOR AND MOTOR COMPRISING SAME

CROSS-REFERENCE TO RELATED PATENT APPLICATIONS

This application is a U.S. National Stage Application under 35 U.S.C. § 371 of PCT Application No. PCT/KR2020/000712, filed Jan. 15, 2020, which claims priority to Korean Patent Application No. 10-2019-0006179, filed Jan. 17, 2019, whose entire disclosures are hereby incorporated by reference.

TECHNICAL FIELD

An embodiment relates to a rotor and a motor including the rotor.

BACKGROUND ART

Motors are apparatuses configured to convert electrical energy to mechanical energy to obtain rotational forces and are widely used for vehicles, home appliances, industrial machines, and the like.

The motor may include a housing, a shaft, a stator disposed on an inner circumferential surface of the housing, a rotor disposed on the shaft, and the like. In this case, the stator of the motor induces an electrical interaction with the rotor to induce rotation of the rotor.

FIG. 1 is a view illustrating a rotor and a stator of a conventional spoke type motor.

Referring to FIG. 1, a conventional motor 2 may include a rotor 10 and a stator 20. In this case, the motor 2 may be formed as a spoke type. Accordingly, the rotor 10 includes a rotor yoke 11 and rotor teeth 12, and magnets 13 are disposed between the rotor teeth 12. In this case, the magnets 13 are radially disposed on the rotor 10 about a shaft. In the case of such a spoke type motor 2, it is characterized by having a large output.

In this case, each of the magnets 13 is formed in the form in which a width is greater than a length in a radial direction. As illustrated in FIG. 1, the magnet 13 may be formed in an elongated bar shape. Accordingly, since the shape of the magnet 13 is fixed to a rectangular parallelepiped shape, there is a limitation in a level of design freedom of the rotor 10.

In addition, since the same type of the magnets 13 is used in the rotor 10, there is a limitation in reducing a cost.

Technical Problem

The present invention is directed to providing a rotor capable of reducing a cost and improving a degree of design freedom by using magnets formed of different materials and a motor including the rotor.

The present invention is directed to providing a rotor of which assemblability is improved by using a rotor core disposed in two stages when two magnets are disposed in a radial direction and a motor including the rotor.

Objectives to be solved by the present invention are not limited to the above-described objectives, and other objectives which are not described above will be clearly understood by those skilled in the art from the following specification.

Technical Solution

One aspect of the present invention provides a motor including a housing, a stator disposed in the housing, a rotor disposed in the stator, and a shaft coupled to the rotor, wherein the rotor includes a first rotor core and a second rotor core coupled to the first rotor core, the first rotor core includes a body, a plurality of first holes formed in the body, and a first protrusion and a second protrusion which protrude from the body, and the second rotor core includes a first unit rotor core having a second-1 hole coupled to the first protrusion, a second unit rotor core having a second-2 hole coupled to the second protrusion, and a space formed between the first unit rotor core and the second unit rotor core.

The rotor may include a plurality of magnets, and each of the plurality of magnets may include a first magnet disposed in the first hole of the first rotor core and a second magnet disposed in the space. In addition, the motor may include fixing parts protruding from both ends of the first unit rotor core in a circumferential direction. In addition, the fixing parts may be disposed on an outer side surface and an inner side surface of the second magnet.

The space, the first magnet, and the second magnet may be respectively provided as the plurality of spaces, the plurality of first magnets, and the plurality of second magnets.

The first hole of the first rotor core and the space of the second rotor core may overlap in a radial direction.

Each of the second-1 hole and the second-2 hole may be formed to have a long axis in the radial direction.

The first unit rotor core and the second unit rotor core may be spaced apart from each other by the space.

The first protrusion of the first rotor core and the first hole of the first rotor core may not overlap in the radial direction.

A width of the space in the circumferential direction may be greater than a width of the first hole in the circumferential direction.

Another aspect of the present invention provides a motor including a housing, a stator disposed in the housing, a rotor disposed in the stator, and a shaft coupled to the rotor, wherein the rotor includes a first rotor core, a second rotor core disposed outside the first rotor core, a plurality of first magnets coupled to the first rotor core, and a plurality of second magnets coupled to the second rotor core, and a flux density of the first magnet is different from a flux density of the second magnet.

The first rotor core may include a body and a plurality of protrusions protruding from the body, and the second rotor core may include a plurality of unit rotor cores coupled to the plurality of protrusions.

Each of the plurality of unit rotor cores may include a second hole coupled to one of the plurality of protrusions.

The number of the plurality of protrusions may be the same as the plurality of unit rotor cores.

The protrusion may have a height in an axial direction of the shaft. In this case, based on the axial direction of the shaft, the height of the protrusion may be the same as a height of the body of the first rotor core.

The body of the first rotor core may include a plurality of first holes in which the plurality of first magnets are disposed.

The first magnet and the second magnet may overlap in a radial direction. In this case, each of the plurality of first holes of the first rotor core may include a bottom region spaced apart from the first magnet. In addition, the first hole may be formed in the body of the first rotor core to pass through the body in the axial direction, and a part of the first hole may be exposed at an outer circumferential surface of the body of the first rotor core.

The first magnet and the second magnet may be disposed to have a predetermined gap (G2) in the radial direction.

A flux density of the second magnet may be lower than a flux density of the first magnet. In this case, a cross-sectional area of the second magnet may be greater than a cross-sectional area of the first magnet. In addition, a length of a long side of the first magnet may be smaller than a length of a long side of the second magnet, and a length of a short side of the first magnet may be smaller than a length of a short side of the second magnet. In addition, the length of the short side of the second magnet may be 1.4 to 1.6 times the length of the short side of the first magnet. In addition, the length of the long side of the second magnet may be 3.0 to 3.2 times the length of the long side of the first magnet.

The protrusion may include an extension and a head connected to the extension, and a maximum width of the head may be greater than a maximum width of the extension. In this case, the second hole may include a first region in which the extension is disposed and a second region in which the head is disposed, and a maximum width of the first region may be smaller than a maximum width of the second region.

Still another aspect of the present invention provides a rotor including a first rotor core and a second rotor core coupled to the first rotor core, wherein the first rotor core includes a body, a plurality of first holes formed in the body, and a first protrusion and a second protrusion which protrude from the body, and the second rotor core includes a first unit rotor core having a second-1 hole coupled to the first protrusion, a second unit rotor core having a second-2 hole coupled to the second protrusion, and a space formed between the first unit rotor core and the second unit rotor core.

The rotor may include a plurality of magnets, and the plurality of magnets may include a first magnet disposed in the first hole of the first rotor core and a second magnet disposed in the space. In addition, the rotor may include fixing parts protruding from both ends of the first unit rotor core in a circumferential direction. In addition, the fixing part may be disposed on an outer side surface and an inner side surface of the second magnet.

In addition, the space, the first magnet, and the second magnet may be respectively provided as a plurality of spaces, a plurality of first magnets, and a plurality of second magnets.

In addition, the first hole of the first rotor core and the space of the second rotor core may overlap in a radial direction.

In addition, each of the second-1 hole and the second-2 hole may be formed to have a long axis in the radial direction.

In addition, the first unit rotor core and the second unit rotor core may be disposed to be spaced apart from each other by the space.

In addition, the first protrusion of the first rotor core and the first hole of the first rotor core may not overlap in the radial direction.

In addition, a width of the space in the circumferential direction may be greater than a width of the first hole in the circumferential direction.

Yet another aspect of the present invention provides a rotor including a first rotor core, a second rotor core disposed outside the first rotor core, a plurality of first magnets coupled to the first rotor core, and a plurality of second magnets coupled to the second rotor core, wherein a flux density of the first magnet is different from a flux density of the second magnet.

The first rotor core may include a body and a plurality of protrusions protruding from the body, and the second rotor core may include a plurality of unit rotor cores coupled to the plurality of protrusions.

Each of the plurality of unit rotor cores may include a second hole coupled to one of the plurality of protrusions.

The number of the plurality of protrusions may be the same as the number of the plurality of unit rotor cores.

The protrusion may have a height in an axial direction. In this case, based on the axial direction, the height of the protrusion may be the same as a height of the body of the first rotor core.

The body of the first rotor core may include a plurality of first holes in which the plurality of first magnets are disposed.

The first magnet and the second magnet may overlap in a radial direction. In this case, each of the plurality of first holes of the first rotor core may include a bottom region spaced apart from the first magnet. In addition, the first hole may be formed in the body of the first rotor core to pass through the body in the axial direction, and a part of the first hole is exposed at an outer circumferential surface of the body of the first rotor core.

The first magnet and the second magnet may be disposed to have a predetermined gap (G2) in the radial direction.

A flux density of the second magnet may be lower than a flux density of the first magnet. In this case, a cross-sectional area of the second magnet may be greater than a cross-sectional area of the first magnet. In addition, a length of a long side of the first magnet may be smaller than a length of a long side of the second magnet, and a length of a short side of the first magnet may be smaller than a length of a short side of the second magnet. In addition, the length of the short side of the second magnet may be 1.4 to 1.6 times the length of the short side of the first magnet. In addition, the length of the long side of the second magnet may be 3.0 to 3.2 times the length of the long side of the first magnet.

The protrusion may include an extension and a head connected to the extension, and a maximum width of the head may be greater than a maximum width of the extension. In this case, the second hole may include a first region in which the extension is disposed and a second region in which the head is disposed, and a maximum width of the first region may be smaller than a maximum width of the second region.

Advantageous Effects

Costs of a rotor and a motor including the rotor according to an embodiment having the above-described structure can be reduced by using magnets formed of different materials.

In addition, a degree of design freedom of the rotor can be improved by using two magnets having different areas. Here, in the rotor, an area of a second magnet disposed outside a first magnet based on a radial direction is formed to be greater than an area of the first magnet so that a coercive force of the second magnet can be maintained.

In addition, when a size of the first magnet is compared to a size of the second magnet, since the size of the first magnet is smaller than the size of the second magnet, an inner side of a rotor tooth can be effectively utilized, and thus a cost of the rotor can be reduced.

In addition, assemblability of the rotor can be improved by using two types of a first rotor core and a second rotor core which are disposed in two stages in the radial direction in order to arrange the first magnet and the second magnet in the radial direction.

In addition, when the first magnet and the second magnet are disposed in the radial direction, since there is a possibility in which problems of degradation of performance due to demagnetization of the magnets and degradation of assembly accuracy due to a repulsive force of the magnets are generated, the performance and the assembly accuracy can be improved by coupling a protrusion of the first rotor core and a hole of the second rotor core. In this case, the hole of the second rotor core can be used as a flux barrier.

Various useful advantages and effects of the embodiments are not limited to the above-described contents and will be more easily understood from descriptions of the specific embodiments.

DESCRIPTION OF DRAWINGS

FIG. 1 is a view illustrating a rotor and a stator of a conventional spoke type motor.

FIG. 2 is a view illustrating a motor according to the embodiment.

FIG. 3 is a view illustrating a stator and a rotor of the motor according to the embodiment.

FIG. 4 is an enlarged view illustrating a region A of FIG. 3.

FIG. 5 is a perspective view illustrating the rotor of the motor according to the embodiment.

FIG. 6 is an exploded perspective view illustrating the rotor of the motor according to the embodiment.

FIG. 7 is a perspective view illustrating a first rotor core and a first magnet of the rotor disposed in the motor according to the embodiment.

FIG. 8 is a plan view illustrating the first rotor core and the first magnet of the rotor disposed in the motor according to the embodiment.

FIG. 9 is a perspective view illustrating the first rotor core of the rotor disposed in the motor according to the embodiment.

FIG. 10 is a plan view illustrating the first rotor core of the rotor disposed in the motor according to the embodiment.

FIG. 11 is a perspective view illustrating a second rotor core and a second magnet of the rotor disposed in the motor according to the embodiment.

FIG. 12 is a plan view illustrating the second rotor core and the second magnet of the rotor disposed in the motor according to the embodiment.

FIG. 13 is a perspective view illustrating the second rotor core of the rotor disposed in the motor according to the embodiment.

FIG. 14 is a plan view illustrating the second rotor core of the rotor disposed in the motor according to the embodiment.

FIG. 15 is a perspective view illustrating a unit rotor core of the rotor disposed in the motor according to the embodiment.

FIG. 16 is a plan view illustrating the unit rotor core of the rotor disposed in the motor according to the embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized in a variety of different forms, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings, and components that are the same or correspond to each other will be denoted by the same reference numerals regardless of the figure numbers, and redundant descriptions will be omitted.

FIG. 2 is a view illustrating a motor according to an embodiment, FIG. 3 is a view illustrating a stator and a rotor of the motor according to the embodiment, and FIG. 4 is an enlarged view illustrating a region A of FIG. 3. In this case, an x-direction illustrated in FIG. 2 denotes a radial direction, and a y-direction denotes an axial direction. In addition, the axial direction is perpendicular to the radial direction. In this case, the axial direction may be a longitudinal direction of the shaft 500.

Referring to FIGS. 2 to 4, a motor 1 according to the embodiment may include a housing 100 in which an opening is formed at one side, a cover 200 disposed on the housing 100, a stator 300 disposed in the housing 100, a rotor 400 disposed inside the stator 300, a shaft 500 rotates with the rotor 400, a busbar 600 disposed above the stator 300, and a sensor part 700 which detects rotation of the shaft 500. In this case, the term "inside" may denote a direction toward a rotation center C of the motor 1 based on the radial direction, and the term "outside" may denote a direction opposite to the term "inside."

The housing 100 and the cover 200 may form an exterior of the motor 1. In addition, the housing 100 may be coupled to the cover 200 to form an accommodation space. Accordingly, as illustrated in FIG. 2, the stator 300, the rotor 400, the shaft 500, and the like may be disposed in the accommodation space. In this case, the shaft 500 is rotatably disposed in the accommodation space. Accordingly, the motor 1 may include bearings B disposed on an upper portion and a lower portion of the shaft 500.

The housing 100 may be formed in a cylindrical shape. In addition, the stator 300, the rotor 400, and the like may be accommodated in the housing 100. In this case, the shape or material of the housing 100 may be variously changed. For example, the housing 100 may be formed of a metal material which firmly withstands even at high temperature.

The housing 100 may include a pocket capable of accommodating the bearing B in a lower portion thereof. In this case, the pocket of the housing 100 may be referred to as a housing pocket.

The cover 200 may be disposed on an upper portion of the housing 100, that is, an open surface of the housing 100, to cover an opening of the housing 100.

In addition, the cover 200 may include a pocket capable of accommodating the bearing B. In this case, the pocket of the cover 200 may be referred to as a cover pocket.

The stator 300 induces an electrical interaction with the rotor 400 to induce rotation of the rotor 400.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Referring to FIGS. 2 and 3, the stator 300 may include a stator core 310, a coil 320 wound around the stator core 310, and an insulator 330 disposed between the stator core 310 and the coil 320.

The coil 320 which generates a rotating magnetic field may be wound around the stator core 310. In this case, the stator core 310 may be provided as one core or a plurality of divided cores which are coupled.

The stator core 310 may be formed in the form in which a plurality of thin steel plates are stacked on each other but is not necessarily limited thereto. For example, the stator core 310 may also be formed as one single product.

The stator core 310 may include a yoke 311 having a cylindrical shape and a plurality of teeth 312 protruding from the yoke 311 in the radial direction. In this case, the plurality of teeth 312 may be disposed to be spaced apart from each other in a circumferential direction of the yoke 311. Accordingly, slots in which the coil 320 is wound may be formed between the teeth 312.

The teeth 312 may be disposed to face the rotor 400. In addition, the coil 320 is wound around each of the teeth 312.

Referring to FIG. 4, the tooth 312 may be disposed to face an outer circumferential surface of a second rotor core 420 disposed on the rotor 400. In this case, the tooth 312 may be disposed to be spaced apart from the outer circumferential surface of the second rotor core 420 in the radial direction. Accordingly, a gap G1 may be formed between an inner side surface 312a of the tooth 312 and the outer circumferential surface of the second rotor core 420 disposed on the rotor 400. In this case, the gap G1 may denote a gap between the tooth 312 and the rotor 400. In addition, the gap G1 may be referred to as a first gap.

The insulator 330 insulates the stator core 310 from the coil 320. Accordingly, the insulator 330 may be disposed between the stator core 310 and the coil 320. Accordingly, the coil 320 may be wound around the stator core 310 on which the insulator 330 is disposed.

The rotor 400 rotates through an electrical interaction with the stator 300. In this case, the rotor 400 disposed inside the stator 300. In addition, the shaft 500 may be disposed to pass through a central portion of the rotor 400.

In this case, based on the center C of the motor 1, a ratio of a maximum distance R1 to an outer side surface of the rotor 400 to a maximum distance R2 to an outer side surface of the stator 300 may be 3:5.

FIG. 5 is a perspective view illustrating the rotor of the motor according to the embodiment, and FIG. 6 is an exploded perspective view illustrating the rotor of the motor according to the embodiment.

Referring to FIGS. 5 and 6, the rotor 400 may include a first rotor core 410, the second rotor core 420 disposed outside the first rotor core 410, a plurality of first magnets 430 coupled to the first rotor core 410, and a plurality of second magnets 440 coupled to the second rotor core 420. In this case, the second rotor core 420 may be formed with a plurality of unit rotor cores 420a.

In addition, the first magnet 430 and the second magnet 440 may be formed of different materials. In addition, a magnet density of the first magnet 430 may be different from a magnet density of the second magnet 440.

Accordingly, a degree of design freedom of the rotor 400 may be improved and a cost may be reduced by using two magnets 430 and 440 formed of different materials and having different areas.

As illustrated in FIG. 4, in a state in which the first magnets 430 are disposed in the first rotor core 410 and the second magnets 440 are disposed in the second rotor core 420, the first magnets 430 and the second magnets 440 may be magnetized. However, in a case in which the first magnets 430 and the second magnets 440 are formed of different materials, since magnetizing currents applied to the first magnets 430 and the second magnets 440 are different, there is a difficulty in the magnetization due to a structure of a general a rotor.

Accordingly, the magnetized first magnets 430 and second magnets 440 may be respectively disposed in the first rotor core 410 and the second rotor core 420 to form the rotor 400.

In this case, since a difficulty in assembly of the first rotor core 410 and the second rotor core 420 may occur due to a repulsive force between the magnetized first magnets 430 and second magnets 440, assemblability of the rotor 400 may be improved by using a coupling structure of the first rotor core 410 and the second rotor core 420. For example, the rotor 400 may include a first rotor part including the first rotor core 410 and the first magnets 430 coupled to the first rotor core 410 and a second rotor part including the second rotor core 420 and the second magnets 440 coupled to the second rotor core 420. In addition, the rotor 400 may be formed by coupling the second rotor part to an outer side of the first rotor part.

FIG. 7 is a perspective view illustrating the first rotor core and the first magnet of the rotor disposed in the motor according to the embodiment, FIG. 8 is a plan view illustrating the first rotor core and the first magnet of the rotor disposed in the motor according to the embodiment, FIG. 9 is a perspective view illustrating the first rotor core of the rotor disposed in the motor according to the embodiment, and FIG. 10 is a plan view illustrating the first rotor core of the rotor disposed in the motor according to the embodiment.

Referring to FIGS. 7 and 8, the plurality of first magnets 430 may be disposed in the first rotor core 410 in the circumferential direction based on the center C.

Referring to FIGS. 7 to 10, the first rotor core 410 may include a body 411, a plurality of protrusions 412 protruding from the body 411 in the radial direction, and a plurality of first holes 413 formed in the body 411. In this case, the body 411 and the protrusions 412 may be integrally formed. In addition, the unit rotor core 420a may be coupled to each of the protrusions 412. In addition, the body 411 may be referred to as a first rotor core body.

The body 411 may include a rotor yoke 411a having a cylindrical shape and rotor teeth 411b which are spaced apart from each other on an outer circumferential surface of the rotor yoke 411a in the circumferential direction and protrude in the radial direction. Accordingly, the first holes 413 may be formed between the rotor teeth 411b.

The protrusions 412 may be formed to protrude from the rotor teeth 411b in the radial direction. In addition, the protrusions 412 may be formed in a shape corresponding to second holes 422.

Each of the protrusions 412 may include an extension 412a extending from the rotor tooth 411b and a head 412b connected to an end portion of the extension 112a. Referring to FIG. 10, when viewed from above, a maximum width of the head 412b may be greater than a maximum width of the extension 412a. In this case, the widths of the head 412b and the extension 412a may be widths in the circumferential direction. In this case, a horizontal cross-section of the head 412b may have a circular shape.

The protrusion 412 may be formed to have a predetermined height H in the axial direction of the shaft 500. In addition, the height H of the protrusion 412 based on the axial direction of the shaft 500 may be the same as a height of the body 411. Accordingly, the first rotor core 410 may be formed to have the predetermined height H. In addition, since the protrusion 412 is coupled to the second rotor core 420, the height H of the first rotor core 410 may be the same as a height of the second rotor core 420 in consideration of a flux due to the first magnet 430 and the second magnet 440.

Meanwhile, one unit rotor core 420a is coupled to each of the protrusions 412, the plurality of protrusions 412 may be divided into first protrusions 412-1 and second protrusions 412-2 in order to clarify a coupling relationship with the unit rotor core 420a disposed in the circumferential direction. In addition, the plurality of first protrusions 412-1 and the second protrusions 412-2 may be alternately disposed in the circumferential direction.

The body 411 of the first rotor core 410 may include the plurality of first holes 413 in which the plurality of first magnets 430 are disposed. In this case, the first hole 413 may be formed to have a long axis in the radial direction. In this case, the "long axis" of the first hole 413 may denote an axis formed in a direction of a greater length when lengths of one side and the other side of the first hole 413 are compared. Accordingly, the long axis of the first hole 413 may be disposed in the radial direction.

In addition, when viewed in the radial direction, the first protrusion 412-1 of the first rotor core 410 and the first hole 413 do not overlap in the radial direction. Accordingly, based on an outer circumferential surface of the first rotor core 410, the first protrusion 4121 and the first hole 413 are disposed to be spaced apart from each other in the circumferential direction.

The first hole 413 may be formed to pass through the body 411 in the axial direction. For example, the first hole 413 may be formed from an upper surface to a lower surface of the body 411.

In addition, a part of the first hole 413 may be formed to be exposed at an outer circumferential surface 411c of the body 411 of the first rotor core 410.

The first rotor core 410 may include support parts 414 protruding from the body 411 in the circumferential direction so as to extend the outer circumferential surface 411c of the body 411. Accordingly, only the part of the first hole 413 may be exposed due to the support parts 414. In addition, since the first magnet 430 is disposed in the first hole 413, only a part of an outer side surface 431 of the first magnet 430 may be exposed based on the outer circumferential surface 411c of the body 411.

As illustrated in FIGS. 8 and 10, the support part 414 may be formed to protrude from an outer end portion of the rotor tooth 411b in the circumferential direction. In addition, the support part 414 may support one region of the outer side surface 431 of the first magnet 430. Accordingly, the support part 414 may be referred to as a separation prevention protrusion.

Meanwhile, the first rotor core 410 may include bottom regions 415 concavely formed in the first holes 413 in the radial direction. In this case, the bottom region 415 may be referred to as a groove.

The bottom region 415 may extend the first hole 413 inward. In this case, a width of the bottom region 415 in the circumferential direction is smaller than a width of the first hole 413 in the circumferential direction. In addition, the bottom region 415 may be formed from the upper surface to the lower surface of the body 411 in the axial direction.

Accordingly, the bottom region 415 may be disposed to be spaced apart from an inner side surface 432 of the first magnet 430. As illustrated in FIG. 8, due to the bottom region 415 formed to have the smaller width than the first magnet 430 in the circumferential direction, the outer circumferential surface of the rotor yoke 411a may be disposed to be spaced apart from the inner side surface 432 of the first magnet 430. Accordingly, the bottom region 415 may serve as a flux barrier against the first magnet 430.

FIG. 11 is a perspective view illustrating the second rotor core and the second magnet of the rotor disposed in the motor according to the embodiment, FIG. 12 is a plan view illustrating the second rotor core and the second magnet of the rotor disposed in the motor according to the embodiment, FIG. 13 is a perspective view illustrating the second rotor core of the rotor disposed in the motor according to the embodiment, and FIG. 14 is a plan view illustrating the second rotor core of the rotor disposed in the motor according to the embodiment.

Referring to FIGS. 11 and 12, the plurality of second magnets 440 may be disposed in the second rotor core 420 in the circumferential direction based on the center C.

Referring to FIGS. 13 and 14, the second rotor core 420 may be formed by arranging the plurality of unit rotor cores 420a to be spaced apart from each other in the circumferential direction based on the center C. Accordingly, spaces S may be formed between the unit rotor cores 420a, and the second magnets 440 may be disposed in the spaces S. In this case, since the unit rotor cores 420a are individually coupled to the protrusions 412 of the first rotor core 410, the number of the unit rotor cores 420a may be the same as the number of the protrusions 412.

Meanwhile, the unit rotor cores 420a may be formed to have the same shape but are not necessarily limited thereto.

However, due to a coupling relationship of the first protrusion 412-1 and the second protrusion 412-2, the plurality of unit rotor cores 420a may include first unit rotor cores 420a-1 coupled to the first protrusions 412-1 and second unit rotor cores 420a-2 coupled to the second protrusions 412-2. Even in this case, the first unit rotor cores 420a-1 and the second unit rotor cores 420a-2 may be alternately disposed in the circumferential direction.

Accordingly, the second rotor core 420 may include the plurality of first unit rotor cores 420a-1, the plurality of second unit rotor cores 420a-2, and the plurality of spaces S formed between the first unit rotor cores 420a-1 and the second unit rotor core 420a-2. Accordingly, the first unit rotor cores 420a-1 and the second unit rotor core 420a-2 may be disposed to be spaced apart from each other by the spaces S in the circumferential direction.

The unit rotor core 420a may be formed to have a shape of which a cross-section has a fan shape. In addition, the unit rotor core 420a may be formed in the form in which a plurality of thin steel plates are stacked on each other but is not necessarily limited thereto. For example, the unit rotor core 420a may be formed as one single product.

FIG. 15 is a perspective view illustrating the unit rotor core of the rotor disposed in the motor according to the embodiment, and FIG. 16 is a plan view illustrating the unit rotor core of the rotor disposed in the motor according to the embodiment.

Referring to FIGS. 15 and 16, each of the unit rotor cores 420a may include a unit rotor core body 421, a second hole 422 formed in the unit rotor core body 421 to be coupled to the protrusion 412 of the first rotor core 410, and fixing parts 423 protruding from both ends of each of an inner side and an outer side of the unit rotor core body 421 in the circumferential direction. In this case, the second holes 422 may be divided into second-1 holes 422-1 and second-2 holes 422-2 according to the protrusions among the first protrusions 412-1 and second protrusions 412-2 coupled thereto. In addition, the second-1 holes 422-1 and the second-2 holes 422-2 may be formed to have long axes in the radial direction.

Accordingly, each of the first unit rotor cores 420a-1 may include a unit rotor core body 421, a second-1 hole 422-1 formed in the unit rotor core body 421 to be coupled to the first protrusion 412-1 of the first rotor core 410, and fixing parts 423 protruding from both ends of each of the inner side and the outer side of the unit rotor core body 421 in the circumferential direction.

In addition, each of the second unit rotor cores 420a-2 may include a unit rotor core body 421, second-2 hole 422-2 formed in the unit rotor core body 421 to be coupled to the second protrusion 412-2 of the first rotor core 410, and fixing parts 423 protruding from both ends of each of the inner side and the outer side of the unit rotor core body 421 in the circumferential direction.

A height of the unit rotor core body 421 in the axial direction may be the same as a height H of the first rotor core 410. Accordingly, when the protrusion 412 having the predetermined height H is disposed in the second hole 422 formed in the unit rotor core body 421, an upper surface of the protrusion 412 may be horizontally coplanar with an upper surface of the unit rotor core body 421.

Meanwhile, a coupling structure of the first rotor core 410 and the second rotor core 420 may be implemented due to coupling of the first protrusion 412-1 of the first rotor core 410 and the second hole 422 of the second rotor core 420. Accordingly, the coupling structure may secure assembly accuracy of the rotor 400 against a repulsive force generated between the first magnet 430 and the second magnet 440.

The second hole 422 may be used as a guide which guides coupling of the protrusion 412. In addition, the second hole 422 may serve as a flux barrier for saturation of a flux.

Accordingly, in the rotor 400, an assembly risk due to the repulsive force between the magnets 430a and 440 formed of different materials can be removed and a spatial efficiency of the rotor 400 can be improved by using the second hole 422 used as the flux barrier as a part for coupling with the first rotor core 410.

The second hole 422 may be formed to pass through the unit rotor core body 421 in the axial direction. For example, the second hole 422 may be formed from the upper surface to a lower surface of the unit rotor core body 421.

In addition, when viewed from the center C, the second hole 422 may be concavely formed from an inner end portion of the unit rotor core body 421 in the radial direction. Accordingly, an inner side of the second hole 422 may be exposed to the inner side of the unit rotor core body 421. For example, the inner side of the second hole 422 may be formed to communicate with the outside.

Referring to FIG. 16, the second hole 422 may include a first region 422a in which the extension 412a of the protrusion 412 is disposed and a second region 422b in which the head 412b of the protrusion 412 is disposed. Accordingly, the second region 422b disposed to communicate with the first region 422a may communicate with the outside through the first region 422a.

In this case, when viewed from above, a maximum width of the first region 422a is smaller than a maximum width of the second region 422b. In this case, the widths of the first region 422a and the second region 422b may be widths in the circumferential direction. Accordingly, when the head 412b of the protrusion 412 is disposed in the second region 422b, the second rotor core 420 is prevented from being separated in the radial direction.

Referring to FIGS. 15 and 16, the fixing parts 423 may be formed on the unit rotor core body 421 to be spaced apart from each other in the radial direction. In this case, according to an arrangement position based on the radial direction, the fixing parts 423 formed at the outer side of the unit rotor core body 421 may be referred to as outer fixing parts 423a, and the fixing parts 423 formed at the inner side of the unit rotor core body 421 may be referred to as inner fixing parts 423b.

Referring to FIGS. 11 and 12, the outer fixing parts 423a may be disposed on an outer side surface 441 of the second magnet 440 to support the second magnet 440. As illustrated in FIG. 16, the outer fixing parts 423a may be formed on the unit rotor core body 421 so as to extend an outer circumferential surface 421a of the unit rotor core body 421. In this case, a protruding length of each of the outer fixing parts 423a may be restricted in consideration of a cogging torque.

Referring to FIGS. 11 and 12, the inner fixing parts 423b may be disposed on an inner side surface 442 of the second magnet 440 to support the second magnet 440. As illustrated in FIG. 16, the inner fixing parts 423b may be formed on the unit rotor core body 421 so as to extend an inner circumferential surface 421b of the unit rotor core body 421.

The second magnet 440 is disposed in each of the plurality of spaces S. Accordingly, the first unit rotor core 420a-1 may be disposed at one side of the space S in the circumferential direction, and the second unit rotor core 420a-2 may be disposed at the other side thereof. In this case, the second magnet 440 may be supported by the fixing parts 423 in the radial direction.

In addition, the space S may be disposed to face the first hole 413 of the first rotor core 410. Accordingly, the first hole 413 of the first rotor core 410 and the second hole 422 of the unit rotor core 420a or the space S may overlap in the radial direction.

Referring to FIGS. 3 and 4, the first magnets 430 and the second magnets 440 may be disposed to face each other in the radial direction. In addition, the plurality of first magnets 430 may be disposed in the first holes 413 of the first rotor core 410, and the plurality of second magnets 440 may be disposed in the spaces S of the second rotor cores 420. In this case, the first magnet 430 and the second magnet 440 may be disposed to have a predetermined gap G2 in the radial direction. In this case, the gap G2 between the first magnet 430 and the second magnet 440 may be referred to as a second gap.

For example, since a part of the first magnet 430 is supported to be exposed by the support parts 414 and a part of the second magnet 440 is supported to be exposed by the inner fixing parts 423b, the gap G2 may be generated. Accordingly, although the first magnet 430 and the second magnet 440 face each other in the radial direction, the second gap, which is an air gap, may be formed between the first magnet 430 and the second magnet 440.

Meanwhile, the magnet density of the second magnet 440 may be different from the magnet density of the first magnet 430. For example, the magnet density of the second magnet 440 is lower than the magnet density of the first magnet 430. In this case, a grade of the first magnet 430 may be N48UH so that a use amount may be small, and a grade of the second magnet 440 may be N40UH so that a use amount may be large.

A cross-sectional area of the second magnet 440 may be greater than a cross-sectional area of the first magnet 430 when viewed from above. Accordingly, a coercive force (iHC) of the second magnet 440 may be maintained, and a demagnetization risk may be reduced.

Accordingly, since a flux amount of the second magnet 440 is maintained, the durability thereof is improved.

A length of a long side of the first magnet 430 may be formed to be smaller than a length of a long side of the second magnet 440, and a length of a short side of the first magnet 430 may be formed to be smaller than a length of a short side of the second magnet 440. In addition, the length of the short side of the second magnet 440 may smaller than the length of the long side of the first magnet 430. In this case, the long side of the first magnet 430 and the long side of the second magnet 440 may be disposed in the radial direction.

In addition, the length of the short side of the second magnet 440 may be 1.4 to 1.6 times the length of the short side of the first magnet 430. In addition, the length of the long side of the second magnet 440 may be 3.0 to 3.2 times the length of the long side of the first magnet 430.

Accordingly, when viewed from above, a size of the second magnet 440 may be greater than a size of the first magnet 430. Accordingly, since a cross-sectional area of the first magnet 430 is smaller than a cross-sectional area of the second magnet 440 when viewed from above, the first magnet 430 occupies a small area of the first rotor core 410, and thus a degree of design freedom of the rotor 400 is improved, and the body 411 of the rotor core 410 may be effectively utilized.

Meanwhile, the first magnets 430 and the second magnets 440 may be respectively fixed to the first rotor core 410 and the second rotor core 420 using an adhesive member (not shown) such as glue but are not necessarily limited thereto.

In this case, 8 first magnets 430 and 8 second magnets 440 may be disposed in the motor 1. In addition, each of the first magnets 430 and the second magnets 440 may be formed in a bar type having a rectangular parallelepiped shape.

Meanwhile, the rotor 400 may further include a can (not shown) disposed to cover the rotor cores 410 and 420 on which the magnets 430 are 440 disposed.

The can may protect the rotor cores 410 and 420 and the magnets 430 and 440 from external impacts or physical and chemical stimuli and block introduction of foreign materials into the rotor cores 410 and 420 and the magnets 430 and 440.

In addition, the can may support coupling of the first rotor core 410 and the second rotor core 420 and prevent separation of the magnets 430 and 440.

The shaft 500 may be coupled to the rotor 400. When an electromagnetic interaction occurs between the rotor 400 and the stator 300, the rotor 400 rotates. In addition, the shaft 500 may also rotate in conjunction with the rotation of the rotor 400.

As illustrated in FIG. 2, the shaft 500 may be rotatably supported by the bearings B in the housing 100 and the cover 200.

The busbar 600 may be disposed above the stator 300.

In addition, the busbar 600 may be electrically connected to the coil 320 of the stator 300.

The busbar 600 may include a busbar body (not shown) and a plurality of terminals (not shown) disposed on the busbar body.

The busbar body may be a mold product formed in a ring shape through an injection molding process. In addition, the terminal may be disposed on the busbar body through an insert-injection molding process. In this case, the terminal may be electrically connected to the coil 320 of the stator 300.

The sensor part 700 may check a present position of the rotor 400 to detect rotation of the shaft 500 by detecting a magnetic force of sensing magnets installed to operate in conjunction with rotation of the rotor 400.

The sensor part 700 may include a sensing magnet assembly 710 and a printed circuit board (PCB) 720.

The sensing magnet assembly 710 is coupled to the shaft 500 to operate in conjunction with the rotor 400 so as to detect the position of the rotor 400. In this case, the sensing magnet assembly 710 may include the sensing magnets and a sensing plate. The sensing magnets may be coaxially coupled to the sensing plate.

The sensing magnets may include main magnets disposed close to a hole forming an inner circumferential surface thereof in the circumferential direction and sub-magnets disposed at an edge thereof. The main magnets may be arranged like the magnets 430 and 440 inserted into the rotor 400 of the motor. The sub-magnets are divided further than the main magnets so that the sub-magnets are formed to have poles of which the number is greater than the number of poles of the main magnets. Accordingly, a rotation angle may be divided and measured more precisely, and thus the motor 1 may be driven more smoothly.

The sensing plate may be formed of a metal material having a disc shape. The sensing magnets may be coupled to an upper surface of the sensing plate. In addition, the sensing plate may be coupled to the shaft 500. In this case, a hole through which the shaft 500 passes may be formed in the sensing plate.

A sensor configured to detect a magnetic force of the sensing magnets may be disposed on the PCB 720. In this case, the sensor may be provided as a Hall integrated circuit

| [Reference Numerals] | |
| --- | --- |
| 1: MOTOR | 100: HOUSING |
| 200: COVER | 300: STATOR |
| 400: ROTOR | 410: FIRST ROTOR CORE |
| 411: BODY | 412: PROTRUSION |
| 413: FIRST HOLE | 420: SECOND ROTOR CORE |
| 420A: UNIT ROTOR CORE | 421: UNIT ROTOR CORE BODY |
| 422: SECOND HOLE | 423: FIXING PART |
| 500: SHAFT | 600: BUSBAR |
| 700: SENSOR PART | |

The invention claimed is:

1. A motor comprising:

a housing;

a stator disposed in the housing;

a rotor disposed in the stator; and a shaft coupled to the rotor, wherein the rotor includes a first rotor core and a second rotor core coupled to the first rotor core, the first rotor core includes a body, a plurality of first holes formed in the body, and a first protrusion and a second protrusion which protrude from the body, and the second rotor core includes a first unit rotor core having a second-1 hole coupled to the first protrusion, a second unit rotor core having a second-2 hole coupled to the second protrusion, and a space formed between the first unit rotor core and the second unit rotor core.

2. The motor of claim 1, wherein:

the rotor includes a plurality of magnets; and each of the plurality of magnets includes a first magnets disposed in the first hole of the first rotor core and a second magnet disposed in the space.

3. The motor of claim 2, comprising fixing parts protruding from both ends of the first unit rotor core in a circumferential direction.

4. The motor of claim 2, wherein each of the plurality of first holes of the first rotor core includes a bottom region spaced apart from the first magnet.

5. The motor of claim 4, wherein:

the first hole is formed in the body of the first rotor core so as to pass through the body in an axial direction; and a part of the first hole is exposed at an outer circumferential surface of the body of the first rotor core.

6. The motor of claim 2, wherein the first magnet and the second magnet are disposed to have a predetermined gap (G2) in a radial direction.

7. The motor of claim 1, wherein the first hole of the first rotor core and the space of the second rotor core overlap in a radial direction.

8. The motor of claim 1, wherein the first unit rotor core and the second unit rotor core are spaced apart from each other due to the space.

9. The motor of claim 1, wherein a width of the space in a circumferential direction is greater than a width of the first hole in the circumferential direction.

10. A motor comprising:

a housing;

a stator disposed in the housing;

a rotor disposed in the stator; and a shaft coupled to the rotor, wherein the rotor includes a first rotor core, a second rotor core disposed outside the first rotor core, a plurality of first magnets coupled to the first rotor core, and a plurality of second magnets coupled to the second rotor core, the magnet and the second magnet are dispose to have a predetermined gap (G2) in a radial direction, and a flux density of the first magnet is different from a flux density of the second magnet.

11. The motor of claim 10, wherein:

the first rotor core includes a body and a plurality of protrusions protruding from the body; and the second rotor core includes a plurality of unit rotor cores coupled to the plurality of protrusions.

12. The motor of claim 11, wherein each of the plurality of unit rotor cores includes a second hole coupled to one of the plurality of protrusions.

13. The motor of claim 11, wherein the body of the first rotor core includes a plurality of first holes in which the plurality of first magnets are disposed.

14. The motor of claim 12, wherein:

the protrusion includes an extension and a head connected to the extension; and a maximum width of the head is greater than a maximum width of the extension.

15. The motor of claim 14, wherein:

the second hole includes a first region in which the extension is disposed and a second region in which the head is disposed; and a maximum width of the first region is smaller than a maximum width of the second region.

16. The motor of claim 10, wherein:

the first rotor core includes a body, a plurality of first holes formed in the body, and a first protrusion and a second protrusion which protrude from the body, and the second rotor core includes a first unit rotor core having a second-1 hole coupled to the first protrusion, a second unit rotor core having a second-2 hole coupled to the second protrusion, and a space formed between the first unit rotor core and the second unit rotor core.

17. The motor of claim 16, wherein:

the first magnet is disposed in the first hole, and the second magnet is disposed in the space.

18. The motor of claim 17, wherein each of the plurality of first holes of the first rotor core includes a bottom region spaced apart from the first magnet.

19. The motor of claim 18, wherein:

the first hole is formed in the body of the first rotor core so as to pass through the body in an axial direction; and a part of the first hole is exposed at an outer circumferential surface of the body of the first rotor core.

20. The motor of claim 16, wherein a width of the space in a circumferential direction is greater than a width of the first hole in the circumferential direction.

* * * * *